US012774746B2

(12) United States Patent
Taxil et al.

(10) Patent No.: US 12,774,746 B2
(45) Date of Patent: Oct. 27, 2026

(54) DEVICE AND METHOD FOR CONTROLLING THE TRACTION OF A HYDRAULIC ASSISTANCE CIRCUIT

(71) Applicant: Poclain Hydraulics Industrie, Verberie (FR)

(72) Inventors: Loris Taxil, Verberie (FR); Claude Didierjean, Verberie (FR); Christophe Patte, Verberie (FR)

(73) Assignee: POCLAIN HYDRALICS INDUSTRIE, Verberie (FR)

(*) Notice: Subject to any disclaimer, the term of this patent is extended or adjusted under 35 U.S.C. 154(b) by 16 days.

(21) Appl. No.: 18/692,621

(22) PCT Filed: Sep. 14, 2022

(86) PCT No.: PCT/FR2022/051732

§ 371 (c)(1),
(2) Date: Mar. 15, 2024

(87) PCT Pub. No.: WO2023/041875

PCT Pub. Date: Feb. 23, 2023

(65) Prior Publication Data

US 2024/0384788 A1 Nov. 21, 2024

(30) Foreign Application Priority Data

Sep. 15, 2021 (FR) ...................................... 2109694

(51) Int. Cl.

*F16H 61/433* (2010.01)
*F16H 61/4008* (2010.01)
*F16H 61/4148* (2010.01)

(52) U.S. Cl.

CPC ....... *F16H 61/433* (2013.01); *F16H 61/4008* (2013.01); *F16H 61/4148* (2013.01)

(58) Field of Classification Search

CPC ............... F16H 61/433; F16H 61/4008; F16H 61/4148; F16H 61/47; F16H 2059/506;
(Continued)

(56) References Cited

U.S. PATENT DOCUMENTS 4,236,595 A * 12/1980 Beck ..................... F16H 61/472 60/443
4,295,539 A 10/1981 Beck et al.
(Continued)

FOREIGN PATENT DOCUMENTS

FR 3105112 A1 6/2021

OTHER PUBLICATIONS

International Search Report for PCT/FR2022/051732, dated Dec. 7, 2022, 2 pages.
(Continued)

*Primary Examiner* — Grant Moubry
*Assistant Examiner* — Ruben Picon-Feliciano
(74) *Attorney, Agent, or Firm* — Lippes Mathias LLP

(57) ABSTRACT

A method for controlling the traction of a vehicle hydraulic assistance circuit, including a target pressure is applied, a setpoint pressure and a theoretical value of a parameter are determined, a pressure setpoint is applied to the hydraulic pump, equal to the setpoint pressure, and an actual value is measured in the hydraulic assistance circuit. The actual value measured in the hydraulic assistance circuit is compared to the theoretical value, and if a gap between the actual value and the theoretical value is greater than a threshold value, a step of adjusting the setpoint is carried out in which the pressure setpoint of the hydraulic pump is modified so that it is equal to an actual pressure, to within an adjustment coefficient.

8 Claims, 3 Drawing Sheets

(58) Field of Classification Search
CPC ........... F16H 2059/6861; F16H 61/431; F16H 61/468; B60Y 2300/18175
See application file for complete search history.

(56) References Cited

U.S. PATENT DOCUMENTS

| | | | | |
|---|---|---|---|---|
| 5,564,519 | A | 10/1996 | Katoh et al. | |
| 7,726,948 | B2 * | 6/2010 | Hunter | F01M 1/16 417/220 |
| 2011/0262227 | A1 | 10/2011 | Christ et al. | |
| 2020/0215909 | A1 * | 7/2020 | Didierjean | B60W 10/04 |
| 2020/0232556 | A1 * | 7/2020 | Didierjean | F16H 59/44 |

OTHER PUBLICATIONS

Search Report for French Patent Application 2109694, dated Mar. 27, 2022, 6 pages.

* cited by examiner

DEVICE AND METHOD FOR CONTROLLING THE TRACTION OF A HYDRAULIC ASSISTANCE CIRCUIT

BACKGROUND OF THE DISCLOUSURE

The present disclosure relates to hydraulic assistance circuits, and relates more precisely to a device and a method for controlling the traction of a hydraulic assistance circuit for a machine or a vehicle comprising a main axle driven in rotation by a transmission of another type, for example a thermal or electrical transmission.

STATE OF THE ART

Different devices are known that seek to limit the impact of the slipping of an engine or of an axle on the progress of a vehicle or of a machine.

Known devices, however, present different problems, particularly in terms of complexity of implementation, of cost and of bulk.

Yet in the case of a vehicle comprising a main axle driven in rotation by a transmission, for example of the thermal or electrical type, and equipped with hydraulic assistance on a secondary axle, there can be a risk of slippage when the assistance is activated and there is low adhesion between the ground and the movement members driven by the hydraulic assistance, such as the wheels. There can also be a risk of slippage on other wheels driven by the main transmission of the vehicle while the assisted axle retains good adhesion, which can have the effect that the assistance accelerates the vehicle and the other driven wheels slip while being dragged because the driver's setpoint speed remains unchanged on the main axle. This can occur, for example, if the load of the main axle is light, for example if the trailer or the bed of a vehicle is empty, over a low-adhesion layer or one generating high resistance to rolling such as sand. Generally, the hydraulically assisted axle overspeeds relative to the vehicle either by slipping, when one or more wheels of the main axle are dragged or blocked, i.e for example one is blocked and one is in contact with the ground, while the average speed of these two wheels is less than the average speed of the wheels of the hydraulic axle. This amounts to saying that the speed of the vehicle becomes greater than the speed imposed on the main axle of the vehicle by the thermal engine.

The detection and the correction of a slippage situation thus remains a recurring problem.

The implementation of a system of traction control in a hydraulic assistance for a vehicle or a machine poses, however, considerable problems in terms of bulk and of weight, or more generally in terms of integration. There exists therefore a need for the integration of a system of this type in a hydraulic assistance circuit.

The present invention thus seeks to respond at least partially to these problems.

SUMMARY OF THE DISCLOSURE

In order to respond at least partially to these problems, the present disclosure proposes a method for controlling the traction of a vehicle hydraulic assistance circuit, said hydraulic assistance circuit comprising a unidirectional variable displacement hydraulic pump, with its displacement controller servo-controlled by a pressure setpoint, said method comprising the following steps

- a control step, wherein a target pressure is applied to the hydraulic assistance circuit, and a setpoint pressure and a theoretical value of a parameter, typically of pressure or of a flow rate, of the hydraulic assistance circuit are determined,
- a setpoint step, wherein a pressure setpoint is applied to the hydraulic pump, equal to the setpoint pressure,
- a measurement step, wherein an actual value is measured in said hydraulic assistance circuit,
- a comparison step, wherein the actual value measured in said hydraulic assistance circuit is compared to the theoretical value,
- if a gap between the actual value and the theoretical value is greater than a threshold value, an step of adjusting the setpoint is carried out in which the pressure setpoint of the hydraulic pump is modified so that it is equal to an actual pressure, to within an adjustment coefficient.

According to one example, following the step of adjusting the setpoint, a rebound step is carried out in which the pressure setpoint is progressively modified so as to return it to the target pressure.

Optionally, prior to the rebound step, a timeout is carried out during which the actual value is compared to the theoretical value, and the rebound step is carried out once the actual value has remained equal to the setpoint value to within a correction coefficient, for a predetermined timeout period or for a predetermined number of cycles.

According to one example, the theoretical value is a theoretical pressure, and the measurement step is carried out by means of a pressure sensor positioned in the hydraulic assistance circuit.

The rebound step is then typically carried out on condition that the pressure setpoint is strictly less than the target pressure.

According to one example, the measurement step and the comparison step are carried out by determining by means of a computer, and by comparing:

- a theoretical flow rate in the hydraulic assistance circuit particularly as a function of theoretical operating parameters of the hydraulic assistance circuit, and
- an actual flow rate, as a function of parameters measured in the hydraulic assistance circuit.

The actual flow rate can then be determined by means of a position sensor of a plate of the hydraulic pump of the hydraulic assistance circuit.

According to one example, during the measurement step and the comparison step, two actual values are measured for two distinct parameters, and the actual value measured in said hydraulic assistance circuit for each of these two parameters is compared to an associated theoretical value for each of these parameters, and the setpoint adjustment step is carried out if a gap between the actual value and the theoretical value of at least one of said two parameters is greater than a threshold value.

These two parameters are, for example, the pressure in the hydraulic circuit and the flow rate in the hydraulic circuit, or a driving speed of a member by the hydraulic assistance circuit and the flow rate in the hydraulic circuit.

The present disclosure also relates to a traction control system of an axle driven in rotation by a hydraulic assistance circuit, said hydraulic assistance circuit comprising unidirectional variable displacement hydraulic pump having its displacement controller servo-controlled by a pressure setpoint, a hydraulic motor suitable for driving a movement member in rotation, the hydraulic pump being linked to the hydraulic motor via an open-loop hydraulic circuit, said traction control system comprising

- a control member, suitable for applying a setpoint to the hydraulic assistance circuit, a computer, suitable for determining a target control pressure as a function of the setpoint applied by the the control member, a pressure setpoint applied to the hydraulic pump and a theoretical value of a parameter of the hydraulic assistance circuit, a sensor, suitable for measuring an actual value of said parameter of the hydraulic assistance circuit, characterized in that said computer is suitable for comparing the actual value to the theoretical value, and, if a gap between the actual value and the theoretical value is greater than a threshold value, to modify the control setpoint so that it is equal to the actual value, to within an adjustment coefficient.

According to one example, the sensor comprises a pressure sensor in the hydraulic circuit.

According to one example, the sensor comprises an inclination sensor of a displacement control plate of the hydraulic pump, and the computer is suitable for determining a theoretical flow rate in the hydraulic circuit, and an actual flow rate delivered by the hydraulic pump as a function of said inclination of the the plate of the hydraulic pump.

According to one example, the sensor comprises a flowmeter. The flowmeter can for example comprise two pressure sensors suitable for measuring the pressure at the terminals of a calibrated restriction of the hydraulic assistance circuit, and the computer is suitable for determining a theoretical flow rate in the hydraulic circuit, and an actual flow rate delivered by the hydraulic pump as a function of the pressure measurements carried out by said pressure sensors.

The present disclosure also relates to a vehicle comprising a system of this type.

BRIEF DESCRIPTION OF THE DRAWINGS

The invention and its advantages will be better understood upon reading the detailed description given hereafter of different embodiments of the invention, given by way of non-limiting examples.

In all the figures, common elements are labeled with identical numerical references.

DETAILED DESCRIPTION OF THE PREFERRED EMBODIMENTS

Figure 1:
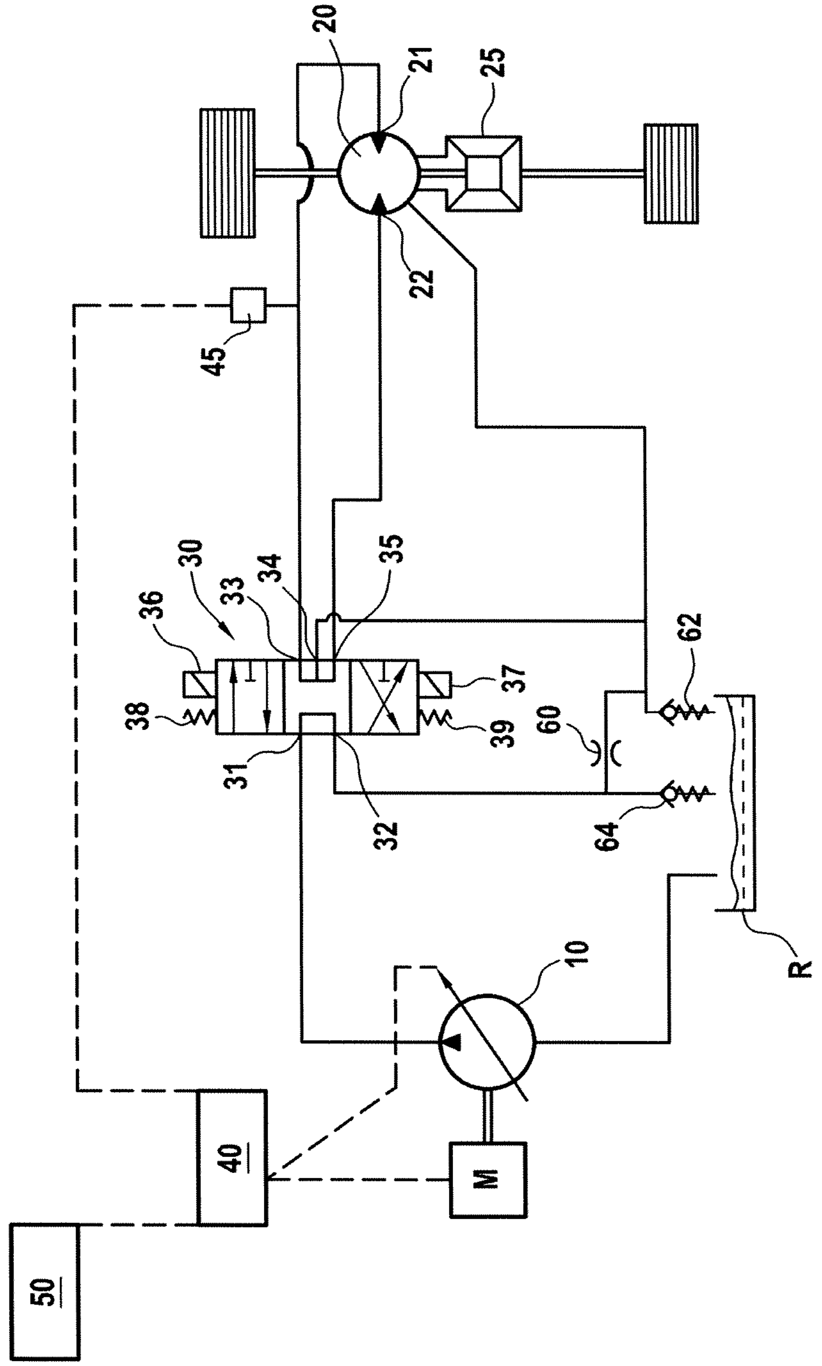
FIG. 1 is a schematic diagram of an existing hydraulic assistance circuit for a vehicle comprising two axles.

FIG. 1 shows schematically an example of a hydraulic assistance circuit for a vehicle.

Shown on this figure is a motor M driving a hydraulic machine 10, performing here the function of a hydraulic pump. Thus this will be designated hereafter as being the hydraulic pump 10. The motor M is typically a thermal engine, or any other type of motor accomplishing the driving of an axle of a vehicle, for example a truck or an agricultural, handling or construction site machine. As previously indicated, the circuit shown is a hydraulic assistance circuit, for a vehicle or a machine comprising a primary axle driven in rotation by another drive source, for example via a thermal engine or electric motor.

The hydraulic pump 10 is a variable displacement hydraulic pump, and is adapted so as to automatically regulate its displacement in order to maintain an output pressure of the hydraulic pump 10. A hydraulic pump 10 of this type is designated as being a unidirectional variable displacement hydraulic pump, with its displacement controller servo-controlled by a pressure setpoint. A pump of this type is commonly designated by the name “load-sensing” pump. Such hydraulic pumps typically have a flow rate in a single direction for open circuit drives, and thus necessitate being associated with directional valves for supplying the members, and/or with reverse-direction directional valves for supplying members whose drive direction can be reversed. The operation of a hydraulic pump 10 of this type is well known, likewise for the elements providing the function of regulating the displacement of the hydraulic pump 10. A hydraulic pump 10 of this type is thus pressure-controlled. It comprises an internal device modulating its displacement so as to attain the pressure setpoint at its output, the control of displacement being accomplished for example by means of a feedback loop. The hydraulic pump 10 thus modulates its displacement; it increases it when the output pressure is less than the pressure setpoint, and reduces it when the output pressure is greater than the pressure setpoint. Such hydraulic pumps can typically achieve zero displacement, and a maximum pressure can reach up to 350 bar or higher. Such hydraulic pumps commonly have a minimum setpoint, comprised for example between 20 and 30 bar. They can be configured to apply this minimum setpoint in the absence of a specific setpoint. The minimum setpoint can typically be achieved by the mechanical configuration of the pump displacement control, and is applied in the absence of a signal received by the pump. The pressure setpoint can be a fixed or variable setpoint. The hydraulic circuit associated with a hydraulic pump 10 of this type is an open type hydraulic circuit.

The hydraulic pump 10 extracts a fluid, typically oil, from a reservoir R, and delivers a flow of fluid into an open hydraulic circuit, so as to selectively supply one or more hydraulic motors 20, here a hydraulic motor 20 which can drive in rotation a vehicle axle provided with wheels and with a differential 25. The hydraulic motor 20 has a casing linked to the reservoir R. The hydraulic motor 20 is typically a radial piston hydraulic motor with a multilobe cam, the structure of which is well known to a person skilled in the art.

It is understood that a circuit of this type can also apply to several hydraulic motors.

Defined generally in the hydraulic circuit are:

an intake line linking the reservoir R to the hydraulic pump 10, a supply line linking the hydraulic pump 10 to the hydraulic motor 20, and a return line, linking the hydraulic motor 20 to the reservoir R.

The link between the hydraulic pump 10 and the hydraulic motors 20 is provided by means of a three-position, open center distributor 30, which is positioned in the supply line.

The three-position distributor 30 has five openings:

a first opening 31 linked to the hydraulic pump 10, a second opening 32 linked to the reservoir R via an optional calibrated check valve 64, a third opening 33 linked to a first opening 21 of the hydraulic motor 20, an optional fourth opening 34 linked to the reservoir R via an optional calibrated check valve 62, and a fifth opening 35 linked to a second opening 22 of the hydraulic motor 20.

In the example illustrated, the second opening 32 and the fourth opening 34 are linked via an optional restriction 60.

In the example illustrated, the casings of the hydraulic motors 20 are linked to the reservoir R via a line that is common with that linking the fourth opening 34 of the three-position distributor 30 to the reservoir R. It is understood, however, that this embodiment is not limiting; the casings of the hydraulic motors 20 on the one hand and the fourth opening 34 of the three-position distributor 30 on the other hand can be connected to the reservoir R via distinct lines. More particularly, the fourth opening 34 of the three-position distributor 30 can be linked directly to the reservoir R, independently of the casings of the hydraulic motors 20.

In a first position, the first opening 31 is linked to the third opening 33, the second opening 32 is linked to the fifth opening, and the fourth opening 34 is closed. This first position thus links the hydraulic pump 10 to the hydraulic motor 20, and thus allows accomplishing driving the hydraulic motor 20 in a first operating direction.

In a second position, the first opening 31 is linked to the second opening 32, the third opening 33, the fourth opening 34 and the fifth opening 35 are linked together. This position corresponds to free-wheel operation of the hydraulic motor 20, the two openings of which, 21 and 22, i.e. intake and discharge, are connected to the reservoir R.

In a third position, the first opening 31 is linked to the fifth opening 35, the second opening 32 is linked to the third opening 33, and the fourth opening is closed. Thus this third position links the hydraulic pump 10 to the hydraulic motor 20, and thus allows accomplishing driving the hydraulic motor 20 in a second operating direction, reversed relative to the first operating direction obtained by means of the first position.

The three-position distributor 30 is controlled via controllers 36 and 37 coupled to return means 38 and 39. The controllers 36 and 37 are typically pneumatic or electrical controllers. The return means 38 and 39 are typically elastic return means such as springs. The three-position distributor 30 is typically in the second position by default (i.e. in the absence of the application of a controller), and the activation of the controller 36 or 37 allows tilting it into the first position or into the third position.

The operation of the three-position distributor 30 is known. When hydraulic assistance is requested, the three-position distributor 30 tilts into its first position or into its third position (via the controller 36 or 37) in order to supply the hydraulic motors 20. When hydraulic assistance is not requested, the three-position distributor 30 returns to its second position, and the hydraulic motors 30 are then linked to the reservoir R, hence to ambient pressure.

As indicated in the introduction, one problem relates to situations of loss of adhesion or slippage of hydraulic assistance of this type, and also situations of loss of adhesion of one or more movement members of a primary axle of the vehicle which leads to a blockage of these movement members while the adhesion of the axle driven by the hydraulic assistance is retained.

The hydraulic circuit as illustrated also comprises a computer 40 suitable in particular for accomplishing the displacement control of the hydraulic pump 10, a control member 50 such as a knob, a lever or a pedal, and a sensor 45 or set of sensors, for example a pressure or flow rate sensor.

Figure 2:
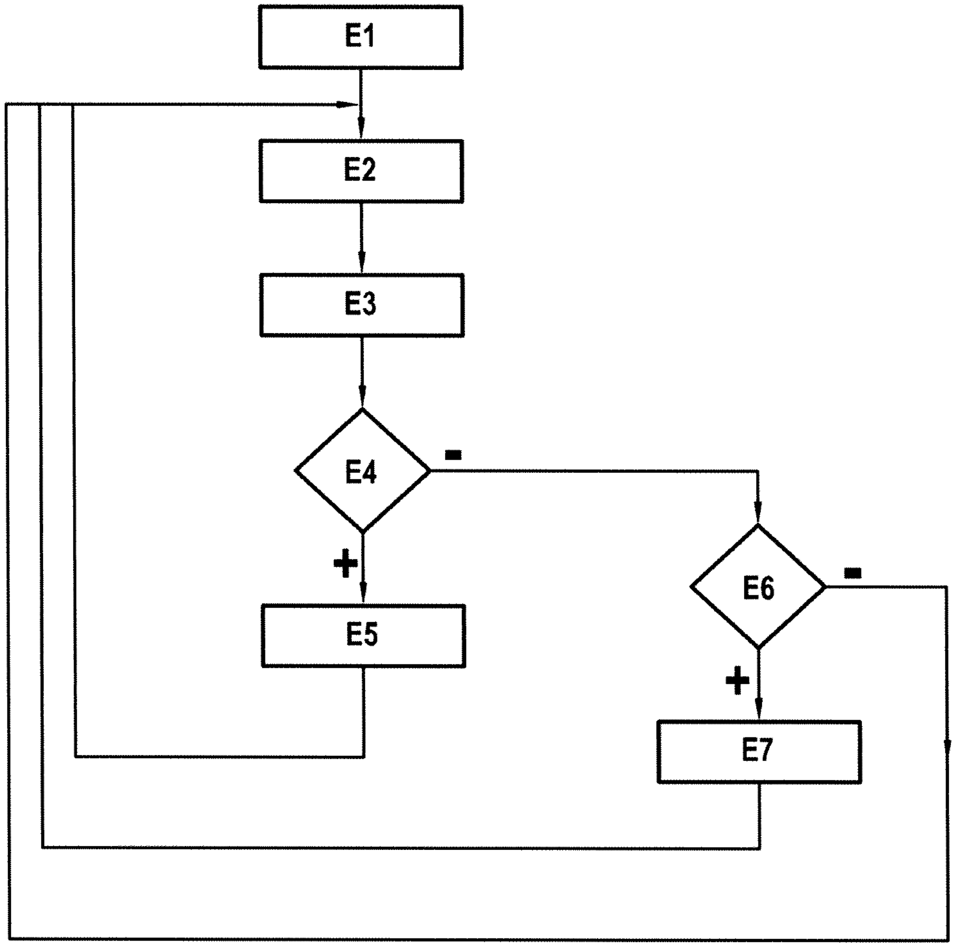
FIG. 2 is a schematic diagram of a traction control method according to one aspect of the disclosure.

FIG. 2 is a diagram that illustrates schematically a traction control method of a hydraulic assistance circuit of this type.

The different steps shown on the diagram of FIG. 2 are described hereafter.

The diagram starts with a control step E1. This step E1 corresponds to the application of a target pressure C to the hydraulic assistance circuit, for example by a user who actuates a control member such as a knob, a pedal or a lever to generate a set point. The target pressure C is then for example proportional to the desired setpoint, or is determined by a computer such as the computer 40 shown in FIG. 1.

The target pressure C is typically regulated between 80 bar and 350 bar. It is typically proportional to the setpoint applied by the user.

The computer 40 then determines a setpoint pressure Pc for the hydraulic assistance circuit and a theoretical flow rate or pressure value Vth of the hydraulic assistance circuit. For example, the theoretical flow rate value can be established based on vehicle speed information, for example a geographic positioning datum, typically of the GPS type, or a wheel speed sensor datum relating to a primary axle of the vehicle, for example by a wheel speed sensor (commonly called an ABS sensor), or as a function of the primary motor speed and of the reduction ratio of the mechanical kinematic chain and of the circumference ratio between the wheels of the different axles.

The setpoint pressure Pc determines the displacement of the hydraulic pump 10 for obtaining the target value, and the theoretical flow rate or pressure value Vth corresponds to a theoretical flow rate or pressure value which is supposed to be established in the hydraulic assistance circuit when considering the setpoint pressure Pc.

In step E2, the pressure setpoint Pls applied to the hydraulic pump 10 is defined, which here is equal to the setpoint pressure Pc. Thus we have Pls=Pc.

In a measurement step E3, an actual value Ve is measured in the hydraulic assistance circuit, typically by means of the sensor 45. This measured actual value corresponds to the theoretical value Vth previously determined. It can for example be a flow rate or pressure value in the hydraulic circuit. An actual pressure Pe is also measured in the case where the actual value Ve measured is not the pressure. If the actual value Ve measured is a pressure value, we then have Pe=Ve.

A comparison step E4 is then carried out. In this step, the measured actual value Ve is compared to the theoretical value Vth.

If the actual value Ve has a sufficient gap relative to the theoretical value Vth, then a step E5 is carried out. Otherwise, step E2 is returned to, or optionally a step E6 is carried out.

This comparison step E4 seeks to identify a situation of loss of adhesion or of slipping.

For example, in the case where the measured value is a flow rate, step E4 then verifies if the actual flow rate (Ve) is greater than the theoretical flow rate (Vth), to within a predetermined gap. In fact, in the event of loss of adhesion, the pressure in the hydraulic circuit drops. The hydraulic pump 10 will then seek to raise it again by increasing its displacement, and therefore its flow rate. Moreover, if the assisted axle has not lost its adhesion, but another movement organ of a primary axle drags or blocks and loses its adhesion, in any event the average speed of the two wheels of the main axle being less than that of the average of the two wheels of the assisted axle, the pressure does not drop but the effective flow rate becomes too high relative to the theoretical flow rate.

In the case where the measured value is a pressure, the step E4 then verifies whether the actual pressure (Ve) is less than the theoretical pressure (Vth) to within a predetermined gap. As previously indicated, a loss of adhesion of a hydraulically assisted member can translate into a loss of pressure in the hydraulic assistance circuit.

The actual value Ve can also be a value of the speed of rotation of the axle or of the considered movement member of the axle driven by the hydraulic assistance, for example one wheel. The actual value Ve can also be a value of the flow rate in the hydraulic circuit; the actual flow rate is then compared with the theoretical flow rate in the hydraulic circuit.

Step E5 is a step of adjusting the setpoint. The pressure setpoint Pls is modified to be equal to the actual pressure Pe to within a coefficient of adjustment Ca, i.e. so that Pls=Pe−Ca. The method then resumes with step E2, and the setpoint pressure Pls thus modified is then applied to the hydraulic pump 10, which modifies the supply of the hydraulic assistance circuit.

The coefficient of adjustment Ca is determined so that the setpoint pressure applied to the hydraulic pump is slightly less than the pressure corresponding to a transmissible torque, and thus allows ensuring adhesion. The coefficient of adjustment Ca is typically comprised between 5 and 30 bar, or for example equal to 20 bar.

Step E6 determines whether the pressure setpoint Pls is less than the target pressure C, or not.

If Pls<C, then step E7 is carried out. Otherwise, i.e. in the case where Pls=C, step E2 is returned to.

Step E7 is a rebound step, in which the pressure setpoint is modified to increase it incrementally. Thus the setpoint pressure is modified so that Pls=Pls+D, where D is an increment of pressure, typically on the order of a few bars, for example comprised between 1 and 20 bars, or even between 1 and 10 bars. Step E2 is then returned to. The pressure setpoint of the hydraulic pump 10 is thus slightly increased, so as to approach the target pressure C.

The increase in pressure can also be accomplished by modifying the pressure setpoint according to a ramp type setpoint, to bring it progressively back to the target pressure C.

Optionally, transition to the step E7 can also be subjected to a timeout condition following the accomplishment of step E5, or for example on condition of repeating step E6 a predetermined number of times. Such conditions allow ensuring pressure stabilization before an increase in the pressure setpoint.

Figure 3:
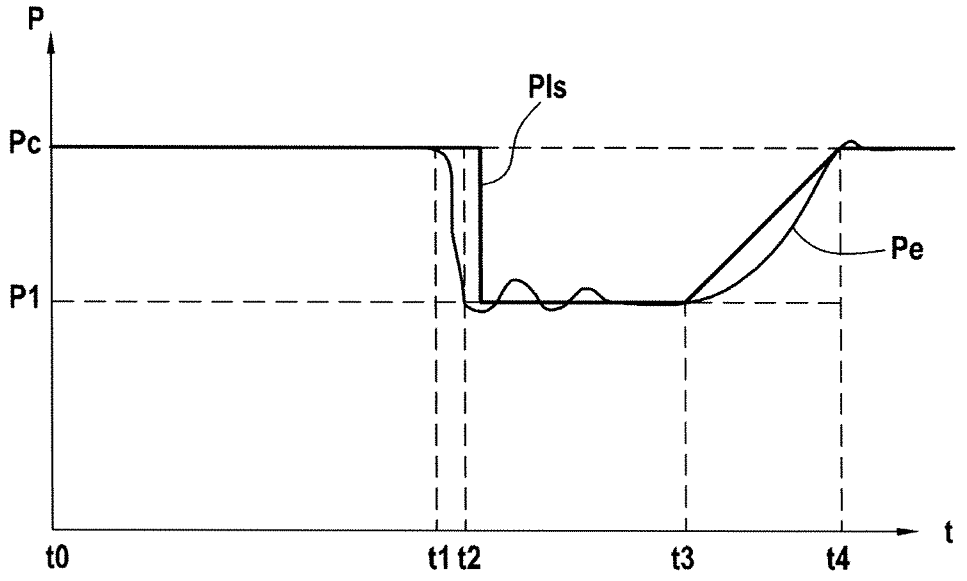
FIG. 3 is a graph illustrating the evolution of the actual presence and of the pressure setpoint of a hydraulic pump controlled by control method of this type.

FIG. 3 is a graph symbolizing the evolution of the actual pressure Pe and of the pressure setpoint Pls over time and during the different steps of the traction control method in the case where the actual measured value Ve is a pressure value.

FIG. 3 initially shows a situation in which the hydraulic assistance is engaged, and in which there is no slippage, i.e. there is no loss of adhesion or of traction for the axle driven by the hydraulic assistance. Thus, between t0 and t1, what is seen on the graph is that the pressure setpoint Pls is equal to the setpoint pressure Pc, and the actual pressure Pe is equal or substantially equal to the pressure setpoint Pls.

At instant t1, a slippage situation is observed, i.e. a loss of adhesion or of traction of the axle or the movement members driven in rotation by the hydraulic assistance. This slippage situation translates into a drop in the actual pressure Pe in the hydraulic assistance circuit.

At instant t2, a gap is detected between Pls and Pe, which corresponds for example to the step E4 described previously. The pressure setpoint Pls of the hydraulic pump 10 is then modified, to be reduced to a value P1. This value P1 is equal here to the value of Pe at instant t2, to within a coefficient of adjustment, as indicated in the step E5 described previously.

An actual pressure Pe stabilization phase is then observed. The actual pressure Pe oscillates around the value P1 of the pressure setpoint Pls, and thus is equal to Pls to within a predetermined gap, then stabilizes at a value equal or substantially equal to P1.

It is understood here that this graph shows a single iteration of the setpoint adjustment step E5, but that several iterations of this step can occur before accomplishing a stabilization of the actual pressure.

The graph shown in FIG. 3 then shows the optional steps E6 and E7.

As indicated previously, following the modification of the pressure setpoint, a phase of actual pressure Pe stabilization is observed, which is thus equal or substantially equal to P1, i.e. equal or substantially equal to the pressure setpoint Pls.

Once this stabilization is established for a predetermined duration, which allows in particular ensuring the correct re-establishment of the adhesion of the hydraulic assistance, the control method as proposed then accomplishes a progressive increase of the pressure setpoint Pls so as to return to the initial setpoint pressure Pc.

It is understood here that a progressive increase is preferable compared to a sudden increase of the pressure setpoint, in that a sudden increase of the pressure setpoint could generate a new loss of adhesion situation.

The confirmation of the stabilization can be accomplished for example by a timeout following the last accomplishment of the setpoint adjustment step E5, or by a given number of iterations of the step E4 during which the measured actual value Ve shows a gap that is less than a predetermined threshold relative to the theoretical value Vth.

The accomplishment of the steps E6 and E7 is visible between the instants t3 and t4. It is seen that the pressure setpoint Pls increases progressively until it attains the initial setpoint pressure Pc value, and that the actual pressure Pe then increases, also progressively, until it attains the initial setpoint pressure Pc.

The progressive increase of the pressure setpoint Pls is shown here according to a ramp type setpoint. It is understood however that this embodiment is not limiting, and that the pressure setpoint can increase by successive increments, which would be translated by successive levels or plateaus.

It is understood that the method as presented can be applied in the case where the actual value Ve is a pressure value measured in the hydraulic assistance circuit, for example at the intake or at the discharge of the hydraulic motor 20, but also in the case where the actual value corresponds to another parameter. It can for example be a value of the flow rate of fluid measured in the hydraulic assistance circuit, for example at the intake or at the discharge of the hydraulic motor 20.

The actual value Ve can also be a measurement of the displacement of the hydraulic pump 10. As indicated previously, the hydraulic pump 10 is a variable displacement hydraulic pump, and is adapted so as to automatically regulate its displacement in order to maintain an output pressure of the hydraulic pump 10. The displacement of the hydraulic pump is regulated by the inclination of a plate which determines the stroke of the pistons. The flow rate can thus be determined via a position sensor of the plate. The flow rate can also be determined by means of an indirect measurement of flow rate, for example comprising pressure sensors positioned on either side of a restriction, preferably a calibrated restriction of the hydraulic assistance circuit.

Optionally, the steps E3 and E4, respectively measurement and comparison, can be doubled. It is then typically possible to measure two actual values for two distinct parameters, for example the pressure and the flow rate, or the speed and the flow rate.

These two actual values are then compared to the associated theoretical values, typically a theoretical value of pressure and a theoretical value of flow rate, or a theoretical value of the speed of a member or of an axle driven by the hydraulic assistance and a theoretical value of flow rate. One such comparison of two parameters can then allow distinguishing the different adhesion loss situations, particularly by distinguishing the slippage situations of a hydraulically assisted member from the situations of blockage of a primary member. By way of an example, in the case of a pressure drop and of an increase in flow rate, a situation of slippage of the hydraulically assisted axle is deduced from it. In the case of a pressure maintained substantially constant and of an increase in flow rate, a situation of blockage of a primary member can be deduced from it. It is also possible to deduce from it knowledge of the condition of the terrain, and to correct the locomotion. In both cases, it is possible to correct the setpoint pressure Pls after having determined that the gap is too great on one or the other, or on both parameters of the hydraulic assistance circuit.

The control method as proposed therefore shows a specific operation, which modifies the pressure setpoint of the hydraulic pump 10 of the hydraulic assistance circuit in the event of detecting a slippage situation, to adjust it to a pressure ensuring a transmittable torque. Optionally, the control method can then provide for a return to an initial setpoint pressure by progressively increasing the setpoint pressure of the hydraulic pump 10 following a slippage situation.

The integration of such a control system is made possible due to the reduced number of components required. The control method as proposed can thus be implemented by a vehicle or machine hydraulic assistance.

Although the present invention has been described by referring to specific exemplary embodiments, it is obvious that modifications and changes can be carried out on these examples without departing from the general scope of the invention as defined in the claims. In particular, individual features of the different embodiments illustrated/mentioned can be combined into additional embodiments. Consequently, the description and the drawings must be considered in an illustrative, rather than a restrictive sense.

It is also obvious that all the features described with reference to a method are transposable, alone or in combination, to a device, and conversely, all features described with reference to a device are transposable, alone or in combination, to a method.

The invention claimed is:

1. A method for controlling the traction of a vehicle hydraulic assistance circuit, said hydraulic assistance circuit comprising a unidirectional variable displacement hydraulic pump, having its displacement controller servo-controlled by a pressure setpoint, said method comprising the following steps:

- a control step, wherein a target pressure is applied to the hydraulic assistance circuit, and a setpoint pressure and a theoretical value of a parameter of the hydraulic assistance circuit are determined;
- a setpoint step, wherein a pressure setpoint is applied to the hydraulic pump, equal to the setpoint pressure;
- a measurement step, wherein an actual value is measured in said hydraulic assistance circuit;
- a comparison step, wherein the actual value measured in said hydraulic assistance circuit is compared to the theoretical value;
- if a gap between the actual value and the theoretical value is greater than a threshold value, a step of adjusting the setpoint is carried out in which the pressure setpoint of the hydraulic pump is modified so that it is equal to an actual pressure, to within an adjustment coefficient;
- wherein following the setpoint step, a rebound step is carried out, wherein the pressure setpoint is progressively modified so as to return it to the target pressure; and
- wherein prior to the rebound step, a timeout is carried out during which the actual value is compared to the theoretical value, and the rebound step is carried out once the actual value has remained equal to the setpoint value to within a correction coefficient, during a predetermined timeout period or during a predetermined number of cycles.

2. The method according to claim 1, wherein the theoretical value is a theoretical pressure, and the measurement step is carried out by means of a pressure sensor positioned in the hydraulic assistance circuit.

3. The method according to claim 2, wherein the rebound step is carried out if the pressure setpoint is strictly less than the target pressure.

4. The method according to claim 1, wherein the measurement step and the comparison step are carried out by determining, by means of a computer and by comparing:

- a theoretical flow rate in the hydraulic assistance circuit as a function in particular of theoretical operating parameters of the hydraulic assistance circuit, and
- an actual flow rate, as a function of the parameters measured in the hydraulic assistance circuit.

5. The method according to claim 4, wherein the actual flow rate is determined by means of a position sensor of a plate of the hydraulic pump of the hydraulic assistance circuit.

6. The method according to claim 1, wherein, during the measurement step and the comparison step, two actual values are measured for two distinct parameters, and the actual value measured in said hydraulic assistance circuit for each of these two parameters is compared to an associated theoretical value for each of these parameters;

- and wherein the setpoint adjustment step is carried out if a gap between the actual value and the theoretical value of at least one of said two parameters is greater than a threshold value.

7. A system for controlling the traction of an axle driven in rotation by a hydraulic assistance circuit, wherein, said hydraulic assistance circuit comprises a unidirectional variable displacement hydraulic pump having its displacement controller servo-controlled by a pressure setpoint, a hydraulic motor suitable for driving a movement member in rotation, the hydraulic pump being connected to the hydraulic motor via an open-loop hydraulic circuit, said traction control system comprising:

- a control member, suitable for applying a setpoint to the hydraulic assistance circuit;
- a computer, suitable for determining a target control pressure as a function of the setpoint applied by the control member, a pressure setpoint applied to the hydraulic pump and a theoretical value of a parameter of the hydraulic assistance circuit;

a sensor, suitable for measuring an actual value of said parameter of the hydraulic assistance circuit, wherein said computer is suitable for comparing the actual value to the theoretical value, and, if a gap between the actual value and the theoretical value is greater than a threshold value, to modify the control setpoint so that it is equal to the actual value, to within an adjustment coefficient;

wherein the sensor comprises a pressure sensor in the hydraulic circuit; and wherein the sensor comprises an inclination sensor of a displacement control plate of the hydraulic pump and the computer is suitable for determining a theoretical flow rate in the hydraulic circuit, and an actual flow rate delivered by the hydraulic pump as a function of said inclination of the plate of the hydraulic pump.

8. The system according to claim 7, wherein the sensor comprises two pressure sensors suitable for measuring the pressure at the terminals of a calibrated restriction of the hydraulic assistance circuit, and the computer is suitable for determining a theoretical flow rate in the hydraulic circuit, and an actual flow rate delivered by the hydraulic pump as a function of the pressure measurements carried out by said pressure sensors.

* * * * *